United States Patent
Bramstedt

(10) Patent No.: US 8,726,877 B2
(45) Date of Patent: May 20, 2014

(54) ENGINE INCLUDING CRANK PIN WITH ANGLED OIL PASSAGEWAY

(75) Inventor: Justin Bramstedt, Viroqua, WI (US)

(73) Assignee: S & S Cycle, Inc., Viola, WI (US)

( * ) Notice: Subject to any disclaimer, the term of this patent is extended or adjusted under 35 U.S.C. 154(b) by 0 days.

(21) Appl. No.: 13/546,466

(22) Filed: Jul. 11, 2012

(65) Prior Publication Data

US 2013/0025563 A1 Jan. 31, 2013

Related U.S. Application Data

(60) Provisional application No. 61/511,357, filed on Jul. 25, 2011.

(51) Int. Cl.
*F16C 7/00* (2006.01)

(52) U.S. Cl.
USPC ............. 123/197.3; 74/602; 74/603; 184/6.5; 123/193.1

(58) Field of Classification Search
USPC .......... 123/197.3, 197.4, 197.1, 193.1, 193.6, 123/195 R; 384/294, 625; 74/602, 603, 605; 184/6.5, 6.12, 6.22
See application file for complete search history.

(56) References Cited

U.S. PATENT DOCUMENTS

| | | | |
|---|---|---|---|
| 5,615,642 A | 4/1997 | Coughlin | |
| 7,418,939 B2 * | 9/2008 | Enright et al. | 123/197.4 |
| 7,694,657 B2 * | 4/2010 | Gunji et al. | 123/54.4 |
| 7,954,600 B2 * | 6/2011 | Ohta | 184/6.5 |
| 2007/0056551 A1 * | 3/2007 | Nakatsuka et al. | 123/197.1 |

* cited by examiner

*Primary Examiner* — Noah Kamen
*Assistant Examiner* — Long T Tran
(74) *Attorney, Agent, or Firm* — Price Heneveld LLP

(57) ABSTRACT

A motorcycle includes a frame and an engine, with the engine including components forming a crankshaft assembly, such as a flywheel, a pinion shaft supporting the flywheel for rotation, a piston assembly including a connecting rod with a base end portion having a bearing support structure, a bearing, and a crank pin. An uninterrupted oil passageway is formed by an axial hole in the pinion shaft, a radial hole in the pinion shaft, an aligned hole in the flywheel, an angled hole in the crank pin, at least one radial hole in the crank pin. The angled hole in the crank pin extends between the inner and outer surfaces, with the angled hole starting on the outer surface at a location along a distance L1 and extends to the inner surface exiting at a location inboard of the distance L1, the angled hole being linear along its length.

17 Claims, 3 Drawing Sheets

Section A-A

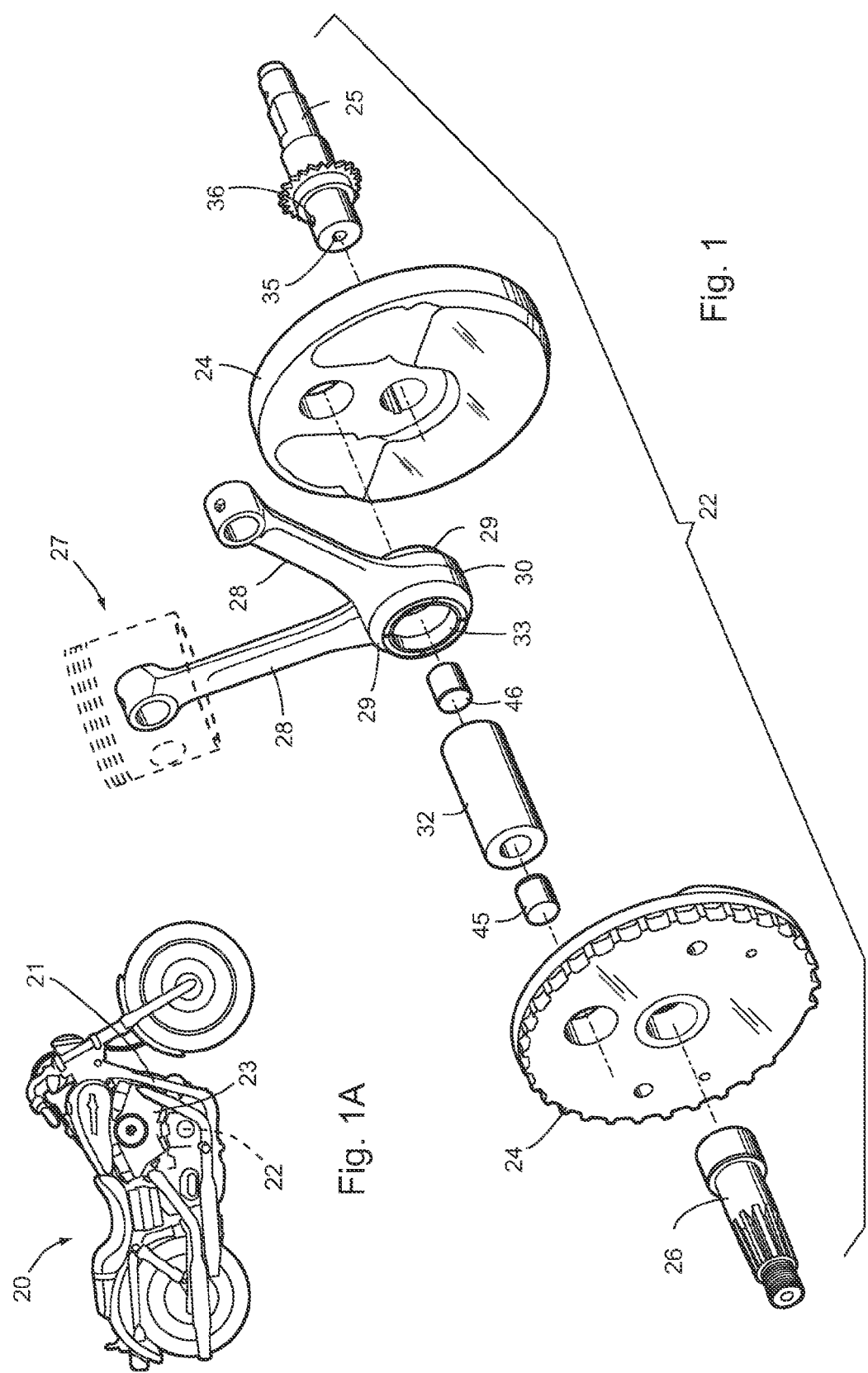

Section A-A

ENGINE INCLUDING CRANK PIN WITH ANGLED OIL PASSAGEWAY

This application claims benefit under 35 USC section 119 (e) of provisional application Ser. No. 61/511,357, filed Jul. 25, 2011, entitled ENGINE INCLUDING CRANK PIN WITH ANGLED OIL PASSAGEWAY, the entire contents of which are incorporated herein in their entirety.

BACKGROUND

The present invention relates to internal combustion engines having a piston and a connecting rod connected to a crank shaft by a crank pin and bearing, where the crank pin includes a hole forming part of an oil passageway for routing oil from a hole in the crank shaft to the bearing.

Coughlin U.S. Pat. No. 5,615,642 discloses an engine where an oil passageway (97) in a crank pin (38) routes oil from a crank spindle (28) to a bushing (64). (See holes 88, 90, 92, 94, and 97.) Also, see Enright U.S. Pat. No. 7,418,939, oil passage in FIG. 2. However, an improved arrangement is desired that facilitates machining and manufacture of the crank pin, and that does so without sacrificing structure and function, and without adversely affecting distribution of oil.

For example, crank pins of the type illustrated herein have an axial hole and also have an oil passageway hole that extends between its inner and outer surfaces at a location inboard from a plug that plugs the axial hole. A positioning of the plug is critical so that the plug isn't inboard so far that it accidentally closes off all or part of the oil passageway hole, and so that the plug isn't outboard so far that it extends beyond an end of the crank pin. Alignment of their oil passageway hole with mating oil passageway holes in mating components can be difficult.

SUMMARY OF THE PRESENT INVENTION

In one aspect of the present invention, an internal combustion engine assembly comprises a flywheel; a pinion shaft supporting the flywheel for rotation; a piston assembly including a connecting rod with a base end portion having a bearing support structure; a bearing; a bearing race; and a tubular crank pin with plugged ends. The bearing is fit around the crank pin and into the bearing race and bearing support structure to support the piston assembly on the crankpin; and an uninterrupted oil passageway is formed by an axial hole in the pinion shaft, a radial hole in the pinion shaft, an aligned hole in the flywheel, an angled hole in the crank pin, and at least one radial hole in the crank pin.

In another aspect of the present invention, a motorcycle includes a frame and an engine on the frame. The engine includes a flywheel, a pinion shaft supporting the flywheel for rotation, a piston assembly including a connecting rod with a base end portion having a bearing support structure, a bearing race, a bearing, and a crank pin. The bearing is fit around the crank pin and into bearing race and bearing support structure to support the piston assembly on the crankpin. An uninterrupted oil passageway is formed by an axial hole in the pinion shaft, a radial hole in the pinion shaft, an aligned hole in the flywheel, an angled hole in the crank pin, and at least one radial hole in the crank pin.

In another aspect of the present invention, a crankshaft assembly is provided for an internal combustion engine having components including a flywheel, a pinion shaft for rotatably supporting the flywheel, a piston assembly including a connecting rod with a base end portion having a bearing support structure, bearing race, and a bearing, the components including passageways that align and connect for routing oil. An improvement comprises a crank pin having a cylindrical outer surface, a cylindrical inner surface forming a center-axis hole, and first and second end surfaces; and a pair of plugs plugging the center-axis hole, one of the plugs plugging the center-axis hole for a distance L1 from the first end surface. The crank pin has an angled hole extending between the inner and outer surfaces, with the angled hole starting on the outer surface at a location along the distance L1 and extending to the inner surface exiting at a location inboard of the distance L1, the angled hole being linear along its length.

In another aspect of the present invention, a crank pin component for an engine includes a crank pin having a cylindrical outer surface adapted to fit into a mating structure on the engine to support one or more of engine components, a cylindrical inner surface forming a center-axis hole, and first and second end surfaces; and a pair of plugs plugging the center-axis hole, each one of the plugs plugging the center-axis hole for a distance L1 from an associated one of the first and second end surface. The crank pin has an angled hole extending between the inner and outer surfaces, the angled hole starting on the outer surface at a location along the distance L1 and extending to the inner surface exiting at a location inboard of the distance L1, with the angled hole being linear along its length.

An object of the present invention is to provide an improved arrangement that facilitates machining and manufacture of the crank pin, and that does so without sacrificing function, and without adversely affecting distribution of oil.

An object of the present invention is to provide a crank pin that allows less critical positioning of a crank-pin plug (i.e. that plugs ends of an axial hole in the crank pin) longitudinally in the crank pin, thus reducing risk of it accidentally closing off all or part of the (radially extending) oil passageway hole.

An object of the present invention is to provide a crank pin with axial hole and radial oil passageway hole, with an entrance to the passageway hole being enlarged on an outer surface of the crank pin, thus making it so that assembly more easily aligns the radial oil passageway hole with mating oil passageway holes.

These and other aspects, objects, and features of the present invention will be understood and appreciated by those skilled in the art upon studying the following specification, claims, and appended drawings.

BRIEF DESCRIPTION OF DRAWINGS

FIG. 1A is a perspective view of a motorcycle with an engine embodying the present invention.

FIGS. 1 and 2 are exploded and assembled views of the crankshaft assembly in FIG. 1A.

DETAILED DESCRIPTION OF PREFERRED EMBODIMENTS

Figure 3:
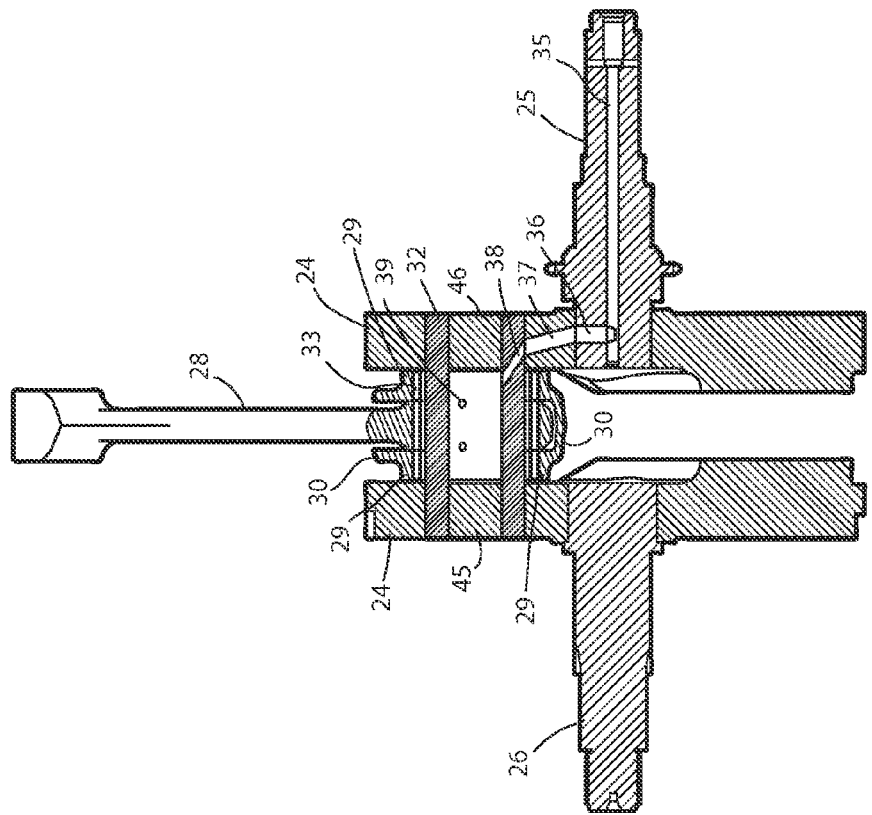
FIG. 3 is a transverse cross section through lines III-III in FIG. 2.
Figure 2:
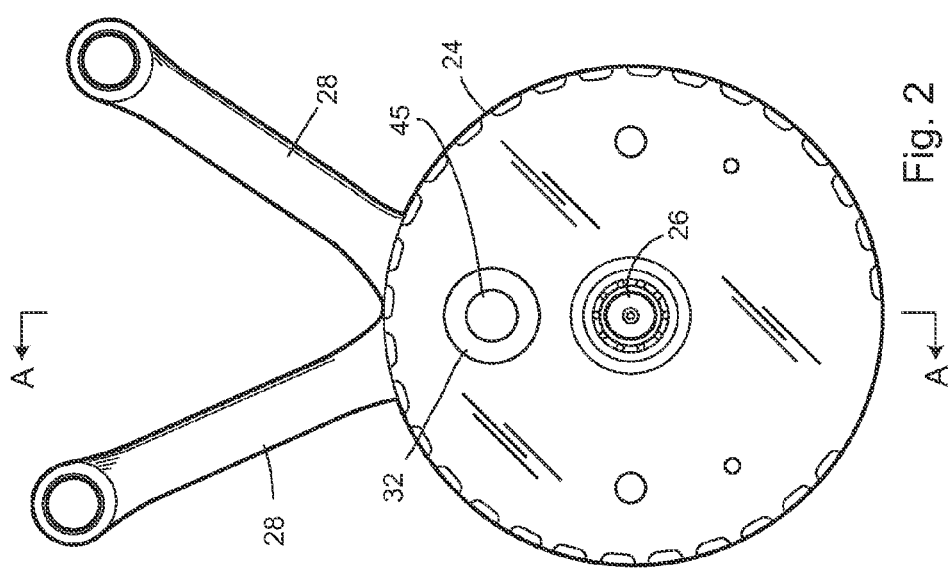
Figure 5:
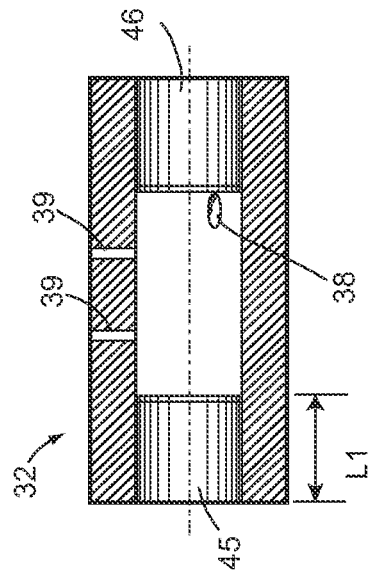
FIGS. 4-5 are longitudinal cross sections at different angles.
Figure 6:
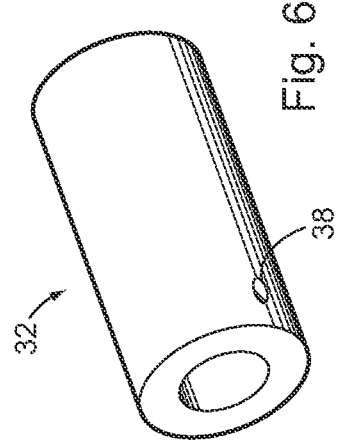
FIG. 6 is a perspective view of the crank pin in FIGS. 1-5.
Figure 4:
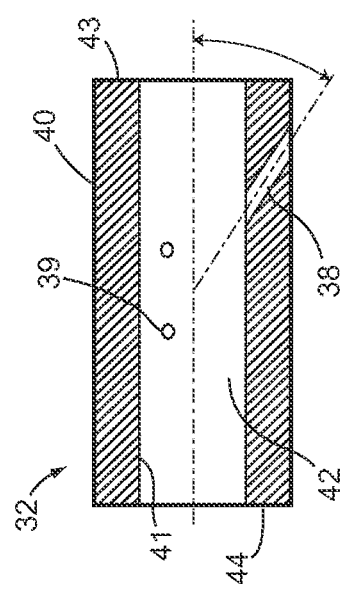

A motorcycle 20 (FIG. 1A) includes a frame 21 and an engine 23 on the frame 21. The engine 23 includes components forming a crankshaft assembly 22, including flywheels 24, a pinion shaft 25 and main shaft 26 supporting the flywheels 24 for rotation, a piston assembly 27 including a connecting rod 28 with a base end portion 29 having a bearing support structure 30, a bearing 33 with a bearing race 33, and a crank pin 32. The bearing 33 fits into bearing support structure 30 and around the crank pin 32 to support the piston assembly 27 on the pinion shaft 25 and main shaft 26. An uninterrupted oil passageway is formed by an axial hole 35 in the pinion shaft 25, a radial hole 36 in the pinion shaft 25, an aligned hole 37 in the flywheel 24, an angled hole 38 in the crank pin 32, at least one radial hole 39 in the crank pin 32. The engine 23 includes an oil pump operably connected to the uninterrupted oil passageway for communicating oil to the bearing 33.

The crank pin 32 has a cylindrical outer surface 40, a cylindrical inner surface 41 forming a center-axis hole 42, and first and second end surfaces 43, 44; and a pair of plugs 45, 46 for plugging the center-axis hole 42, with the plug 45 plugging the center-axis hole 42 for a distance L1 from the first end surface 43. The crank pin 32 has an angled hole 38 extending between the inner and outer surfaces 40, 41, with the angled hole 38 starting on the outer surface 40 at a location along the distance L1 and extending to the inner surface 41 exiting at a location inboard of the distance L1, the angled hole 38 being linear along its length. It is noted that due to the angled orientation of the angled hole 38, it presents an enlarged opening area on the outer surface 40, thus reducing criticality of alignment with other holes forming the oil passageway.

It is contemplated that the angle and size of the angled hole 38 can be adjusted to accommodate specific functional and operations requirements of the engine 23. In the illustrated arrangement, the crank pin 32 is about 1½ inches in diameter, about 3½ inches long, and the ID of the inner surface 41 is about ¾ inch. The distance L1 of the plug 45 is about 1 inch, and it is sized to friction fit into the inner surface 41. The illustrated angled hole 38 has an angle of about 33 degrees from a longitudinal centerline of the crank pin 32. The angled hole 38 enters the outer surface 40 at about 0.5 inches inboard of an end of the crank pin 32 and exits the inner surface 41 at about 1⅛ inches. However, it is noted that the present inventive concepts are not believed to be limited to the specific illustrated dimensions or dimensional ratios. At the same time, the above general relationship of dimensions and angulations maintain a strength and integrity of the structure of the crank pin while, as noted above, simplifying and facilitating machining operations.

There is a more subtle element of the present innovation. The present plugs 45, 46 not only seal the center-axis hole 42 of the crank pin 32, they also are designed to interference fit into the center-axis hole 42 to put pressure outward on the crank pin 32. Thus helps maintain the crank pin 32 in the flywheel 24. Further, because the angled hole 38 extends at an angle, the present plugs 45, 46 can be a distance L1 equal to a thickness of the flywheel 24, thus providing a wider area of support and greater retention force. It is contemplated that modifications can be made without departing from the present inventive concept, such as modifications including longer or shorter plugs, and also such as two short end-located center-axis holes instead of a long single center-axis hole 42.

In known prior art designs with oil-passageway-holes that extend radially at 90 degrees, the prior art plugs cannot be a same distance as the flywheel's thickness, since the plug would cover an end of the hole. Instead, the prior art plugs would have to be shorter, thus reducing surface contact area and reducing retention force by at least the amount that they are "shorter".

The present arrangement including angled hole 38 and plugs 45, 46 are considered to be a significant improvement in part because they maintain an integrity of the circumference of the plug and maintain the "complete 360 degree" contact of the present plugs 45, 46. For example, if a channel was machined into an outer surface of the plug to distribute oil axially along the outer surface of the plug, it would be more costly, have alignment issues, provide a reduced retention force, and reduce structural integrity of the plug. Thus, the present plug arrangement is considered to be a significant improvement over concepts that "violate" or remove material of the plugs at or near the ends of the plugs.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A motorcycle, comprising:
    a frame;
    an engine on the frame, the engine including:
        a flywheel;
        a pinion shaft supporting the flywheel for rotation;
        a piston assembly including a connecting rod with a base end portion having a bearing support structure;
        a bearing;
        a crank pin, the bearing being fit around the crank pin and fit into bearing support structure to support the piston assembly on the crank pin; and
        an uninterrupted oil passageway formed by an axial hole in the pinion shaft, a radial hole in the pinion shaft, an aligned hole in the flywheel, an angled hole in the crank pin, and at least one radial hole in one of the crank pin;
    wherein the angled hole defines an angle of at least about 45 degrees from a longitudinal centerline of the crank pin.

2. The assembly of claim 1, wherein the angle of the angled hole defines an angle of at least about 33 degrees from the longitudinal centerline of the crank pin.

3. The assembly of claim 1, including a crank case and an oil pump operably connected to the uninterrupted oil passageway.

4. A motorcycle, comprising:
    a frame;
    an engine on the frame, the engine including:
        a flywheel;
        a pinion shaft supporting the flywheel for rotation;
        a piston assembly including a connecting rod with a base end portion having a bearing support structure;
        a bearing;
        a crank pin, the bearing being fit around the crank pin and fit into bearing support structure to support the piston assembly on the crank pin; and
        an uninterrupted oil passageway formed by an axial hole in the pinion shaft, a radial hole in the pinion shaft, an aligned hole in the flywheel, an angled hole in the crank pin, and at least one radial hole in one of the crank pin;
    wherein the angled hole defines enlarged openings larger than a diameter of the hole in an inner surface and in an outer surface of the crank pin, the enlarged openings facilitating alignment with the axial hole in the pinion shaft and the aligned hole in the flywheel.

5. The assembly of claim 4, wherein the angled hole enters the outer surface at about 0.5 inches inboard of an end of the crank pin and exits the inner surface at about 1⅛ inches from the end.

6. A crankshaft assembly for an internal combustion engine having components including a flywheel, a pinion shaft for rotational support of the flywheel, a piston assembly including a connecting rod with a base end portion having a bearing support structure, and a bearing, the components including passageways that align and connect for routing oil, an improvement comprising:
- a crank pin having a cylindrical outer surface, a cylindrical inner surface forming a center-axis hole, and first and second end surfaces;
- a pair of plugs plugging the center-axis hole, each one of the plugs plugging the center-axis hole for a distance L1 from an associated one of the first and second end surface; and
- the crank pin having an angled hole extending between the inner and outer surfaces, the angled hole starting on the outer surface at a location along the distance L1 and extending to the inner surface exiting at a location inboard of the distance L1, the angled hole being linear along its length, wherein the angled hole defines an angle of at least about 45 degrees from a longitudinal centerline of the crank pin.

7. The assembly of claim 6, wherein the angle of the angled hole defines an angle of at least about 33 degrees from the longitudinal centerline of the crank pin.

8. A crankshaft assembly for an internal combustion engine having components including a flywheel, a pinion shaft for rotational support of the flywheel, a piston assembly including a connecting rod with a base end portion having a bearing support structure, and a bearing, the components including passageways that align and connect for routing oil, an improvement comprising:
- a crank pin having a cylindrical outer surface, a cylindrical inner surface forming a center-axis hole, and first and second end surfaces;
- a pair of plugs plugging the center-axis hole, each one of the plugs plugging the center-axis hole for a distance L1 from an associated one of the first and second end surface; and
- the crank pin having an angled hole extending between the inner and outer surfaces, the angled hole starting on the outer surface at a location along the distance L1 and extending to the inner surface exiting at a location inboard of the distance L1, the angled hole being linear along its length; wherein the angled hole defines enlarged openings larger than a diameter of the hole in an inner surface and in an outer surface of the crank pin, the enlarged openings facilitating alignment with the axial hole in the pinion shaft and the aligned hole in the flywheel.

9. A crankshaft assembly for an internal combustion engine having components including a flywheel, a pinion shaft for rotational support of the flywheel, a piston assembly including a connecting rod with a base end portion having a bearing support structure, and a bearing, the components including passageways that align and connect for routing oil, an improvement comprising:
- a crank pin having a cylindrical outer surface, a cylindrical inner surface forming a center-axis hole, and first and second end surfaces;
- a pair of plugs plugging the center-axis hole, each one of the plugs plugging the center-axis hole for a distance L1 from an associated one of the first and second end surface; and
- the crank pin having an angled hole extending between the inner and outer surfaces, the angled hole starting on the outer surface at a location along the distance L1 and extending to the inner surface exiting at a location inboard of the distance L1, the angled hole being linear along its length; wherein the angled hole enters the outer surface at about 0.5 inches inboard of an end of the crank pin and exits the inner surface at about 1⅛ inches from the end.

10. A crankshaft assembly for an internal combustion engine having components including a flywheel, a pinion shaft for rotational support of the flywheel, a piston assembly including a connecting rod with a base end portion having a bearing support structure, and a bearing, the components including passageways that align and connect for routing oil, an improvement comprising:
- a crank pin having a cylindrical outer surface, a cylindrical inner surface forming a center-axis hole, and first and second end surfaces;
- a pair of plugs plugging the center-axis hole, each one of the plugs plugging the center-axis hole for a distance L1 from an associated one of the first and second end surface; and
- the crank pin having an angled hole extending between the inner and outer surfaces, the angled hole starting on the outer surface at a location along the distance L1 and extending to the inner surface exiting at a location inboard of the distance L1, the angled hole being linear along its length; wherein the crank pin is tubular and has an inner surface, and including a plug fit into an end of the crank pin, the plug being sized to friction fit into the inner surface.

11. An internal combustion engine assembly, comprising:
- a flywheel and pinion shaft supporting the flywheel for rotation;
- a piston assembly including a connecting rod with a base end portion having a bearing support structure;
- a bearing;
- a tubular crank pin with plugged ends, the bearing being fit around the crank pin and into the bearing support structure to support the piston assembly on the spindle, the crank pin being tubular and having an inner surface and including at least one plug fit into an end of the crank pin that is sized to friction fit into the inner surface; and
- an uninterrupted oil passageway formed by an axial hole in the pinion shaft, a radial hole in the pinion shaft, an aligned hole in the flywheel, an angled hole in the crank pin, and at least one radial hole in the crank pin.

12. An internal combustion engine assembly, comprising:
- a flywheel and pinion shaft supporting the flywheel for rotation;
- a piston assembly including a connecting rod with a base end portion having a bearing support structure;
- a bearing;
- a tubular crank pin with plugged ends, the bearing being fit around the crank pin and into the bearing support structure to support the piston assembly on the spindle; and
- an uninterrupted oil passageway formed by an axial hole in the pinion shaft, a radial hole in the pinion shaft, an aligned hole in the flywheel, an angled hole in the crank pin, and at least one radial hole in the crank pin;
- wherein the angled hole defines an angle of at least about 45 degrees from a longitudinal centerline of the crank pin.

13. The assembly of claim 12, wherein the angle of the angled hole defines an angle of at least about 33 degrees from the longitudinal centerline of the crank pin.

14. The assembly of claim 12, wherein the angled hole defines enlarged openings larger than a diameter of the hole in an inner surface and in an outer surface of the crank pin, the enlarged openings facilitating alignment with the axial hole in the pinion shaft and the aligned hole in the flywheel.

15. The assembly of claim 14, wherein the angled hole enters the outer surface at about 0.5 inches inboard of an end of the crank pin and exits the inner surface at about 1⅛ inches from the end.

16. The assembly of claim 11, including a crank case and an oil pump operably connected to the uninterrupted oil passageway.

17. The assembly of claim 16, the plug being about 1 inch long.

\* \* \* \* \*